US011050506B2

(12) United States Patent
Um et al.

(10) Patent No.: US 11,050,506 B2
(45) Date of Patent: Jun. 29, 2021

(54) METHOD AND APPARATUS FOR ANALYSIS OF SPECTRUM USE STATUS

(71) Applicant: Electronics and Telecommunications Research Institute, Daejeon (KR)

(72) Inventors: Jung Sun Um, Daejeon (KR); Igor Kim, Daejeon (KR); Seung Keun Park, Daejeon (KR); Hyeyeon Kwon, Daejeon (KR); Yunbae Kim, Daejeon (KR); Young Hwan Lee, Daejeon (KR)

(73) Assignee: Electronics and Telecommunications Research institute, Daejeon (KR)

( * ) Notice: Subject to any disclaimer, the term of this patent is extended or adjusted under 35 U.S.C. 154(b) by 40 days.

(21) Appl. No.: 16/275,096

(22) Filed: Feb. 13, 2019

(65) Prior Publication Data

US 2020/0106548 A1 Apr. 2, 2020

(30) Foreign Application Priority Data

Oct. 2, 2018 (KR) .................. 10-2018-0117707

(51) Int. Cl.
*H04L 1/00* (2006.01)
*H04W 72/04* (2009.01)
*G06F 11/10* (2006.01)
*H04W 74/08* (2009.01)
*H04L 5/00* (2006.01)
*H04W 16/14* (2009.01)

(52) U.S. Cl.
CPC ........ *H04L 1/0009* (2013.01); *G06F 11/1004* (2013.01); *H04W 72/042* (2013.01); *H04W 72/044* (2013.01); *H04W 74/0833* (2013.01); *H04L 1/0061* (2013.01); *H04L 1/0072* (2013.01); *H04L 5/0098* (2013.01); *H04W 16/14* (2013.01); *H04W 72/0446* (2013.01); *H04W 72/0453* (2013.01)

(58) Field of Classification Search
CPC ........... H04W 72/042; H04W 72/0446; H04W 72/0453; H04W 72/1289; H04W 48/12; H04W 16/14; H04W 74/0833; H04W 72/044; H04L 1/0072; H04L 1/0061; H04L 5/0098; H04L 1/0009; G06F 11/1004
See application file for complete search history.

(56) References Cited

U.S. PATENT DOCUMENTS

| | | | |
|---|---|---|---|
| 2010/0034139 A1* | 2/2010 | Love | H04L 1/0057 370/328 |
| 2011/0134875 A1* | 6/2011 | Ding | H04B 7/024 370/329 |
| 2013/0010709 A1 | 1/2013 | Earnshaw et al. | |
| 2013/0107809 A1 | 5/2013 | Ko et al. | |
| 2013/0195041 A1* | 8/2013 | Papasakellariou | H04W 72/042 370/329 |
| 2014/0140306 A1 | 5/2014 | Malladi et al. | |
| 2014/0211710 A1* | 7/2014 | Guan | H04B 7/0689 370/329 |

(Continued)

*Primary Examiner* — April Y Blair
*Assistant Examiner* — Sazzad Hossain
(74) *Attorney, Agent, or Firm* — William Park & Associates Ltd.

(57) ABSTRACT

An apparatus for analyzing a frequency use status may obtain a candidate radio network temporary identifier (RNTI) using downlink control information (DCI), estimate an active RNTI from the candidate RNTI, and analyze a frequency use status using the active RNTI.

19 Claims, 6 Drawing Sheets

(56) References Cited

U.S. PATENT DOCUMENTS

| | | | |
|---|---|---|---|
| 2014/0308953 A1 | 10/2014 | Park et al. | |
| 2015/0189625 A1* | 7/2015 | Shen | H04W 72/1278 370/329 |
| 2015/0282134 A1* | 10/2015 | Suzuki | H04L 27/2602 370/329 |
| 2016/0007373 A1 | 1/2016 | Davydov et al. | |
| 2016/0057776 A1* | 2/2016 | Farkas | H04W 72/1278 370/329 |
| 2016/0073339 A1* | 3/2016 | Tabet | H04L 1/0003 370/311 |
| 2016/0205669 A1* | 7/2016 | Kusashima | H04L 5/0092 370/280 |
| 2016/0227571 A1 | 8/2016 | Baek et al. | |
| 2017/0318605 A1* | 11/2017 | Wijetunge | H04L 5/14 |
| 2018/0234988 A1* | 8/2018 | Shimezawa | H04W 72/042 |
| 2019/0097762 A1* | 3/2019 | Jeon | H04W 28/04 |
| 2019/0215810 A1* | 7/2019 | Mu | H04L 1/1812 |

\* cited by examiner

CCE IQ

Encoder out

Depatterning

SNR(=MeanXPwr/ErrorPwr)
=-4.62dB

METHOD AND APPARATUS FOR ANALYSIS OF SPECTRUM USE STATUS

CROSS-REFERENCE TO RELATED APPLICATIONS

This application claims the benefit under 35 USC § 119(a) of Korean Patent Application No. 10-2018-0117707 filed on Oct. 2, 2018, in the Korean Intellectual Property Office, the entire disclosure of which is incorporated herein by reference for all purposes.

BACKGROUND

1. Field

The following description relates to a method and apparatus for analyzing a mobile frequency use status, and more particularly, to a method and apparatus for analyzing a status of usage of allocated frequencies when not being connected to a mobile communication network or a network.

2. Description of Related Art

When a user terminal is connected under radio resource control (RRC), the user terminal receives an allocated radio network temporary identifier (RNTI) from a cell. A base station may transmit a 16-bit cyclic redundancy check (CRC) to downlink control information (DCI) such that the terminal verifies an error in receiving the DCI. Herein, the RNTI of the terminal receiving the DCI may be subject to an exclusive or (XOR) operation or masking along with the CRC. Thus, the terminal may use the allocated RNTI to obtain the DCI transmitted during a CRC error checking process.

Thus, there needs a method of obtaining an RNTI and DCI allocated to a terminal by a base station or a cell without being in an RRC connection to a mobile communication network, dissimilar to a method of obtaining DCI using an RNTI while being in an RRC connection, and of analyzing a status of usage of frequency resources in use.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect provides a method and apparatus for analyzing a status of usage of allocated frequencies without being in a radio resource control (RRC) connection to a mobile communication network or a network.

Another aspect provides a method and apparatus for obtaining a radio network temporary identifier (RNTI) or downlink control information (DCI) of a wireless communication system without information about a base station or a cell, and analyzing a downlink or uplink frequency use status using the obtained RNTI or DCI.

According to an aspect, there is provided a method of analyzing a frequency use status, the method including obtaining a candidate RNTI using DCI, estimating an active RNTI from the candidate RNTI, and analyzing a frequency use status using the estimated active RNTI.

The obtaining of the candidate RNTI may include decoding the DCI using a random-access-RNTI (RA-RNTI) used to transmit a temporary cell-RNTI (TC-RNTI) allocated to a terminal by a base station, and obtaining the candidate RNTI from data transmitted through a physical downlink shared channel (PDSCH) specified by the DCI.

The estimating of the active RNTI from the candidate RNTI may include determining the obtained candidate RNTI to be the active RNTI.

The obtaining of the candidate RNTI may include decoding a coded bit string of the DCI, estimating a cyclic redundancy check (CRC) from the decoded bit string, and performing an exclusive or (XOR) operation on the estimated CRC and a CRC of the decoded bit string.

The estimating of the active RNTI from the candidate RNTI may include determining whether a control channel element (CCE) index corresponding to a physical downlink control channel (PDCCH) transmitting the DCI including the candidate RNTI is included in a result of a hash function for the candidate RNTI, and estimating the candidate RNTI as the active RNTI when the CCE index is determined to be included in the result of the hash function.

The estimating of the active RNTI from the candidate RNTI may include determining a hamming distance between a bit string re-encoded from the decoded bit string and the coded bit string of the DCI, and estimating the candidate RNTI as the active RNTI when the determined hamming distance is less than equal to a threshold hamming distance $HD_x$.

The estimating of the active RNTI from the candidate RNTI may include estimating the candidate RNTI as the active RNTI, when a path metric calculated during the decoding increases to a value or greater, or when a difference between path metrics is less than or equal to a threshold value.

The estimating of the active RNTI from the candidate RNTI may include estimating the candidate RNTI as the active RNTI using depatterning between a modulated constellation point of a bit string re-encoded from the decoded bit string and a, modulated constellation point of the coded bit string of the DCI.

The depatterning may indicate a complex conjugate operation between the modulated constellation point of the bit string re-encoded from the decoded bit string and the modulated constellation point of the coded bit string of the DCI.

The method may further include calculating an error between an average of results from the depatterning and each of the results from the depatterning, and estimating the candidate RNTI as the active RNTI when a signal-to-noise ratio (SNR) determined through the error is greater than or equal to a threshold value.

The method may further include managing an active RNTI list including the estimated active RNTI.

The managing of the active RNTI list may include adding the active RNTI to the active RNTI list. The active RNTI to be added to the active RNTI list may be an RNTI obtained in a random-access channel (RACH) process in which the terminal attempts to be connected to the cell, an RNTI in which a DCI format of 0 appears $N_{F0}$ times or more, or an RNTI appearing N times or more during a predetermined time $T_0$ configured by subframe unit.

The managing of the active RNTI list may include deleting the active RNTI from the active RNTI list. The active RNTI to be deleted from the active RNTI list may be an RNTI that does not appear in a PDCCH during a time $T_R$ indicated by a number of subframes.

The analyzing of the frequency use status may include analyzing a resource block (RB) usage rate. The RB usage rate may be analyzed using an RB allocation field of the DCI transmitted to the active RNTI, or analyzed using an RB occupied in the PDSCH.

The analyzing of the frequency use status may include analyzing traffic. The traffic may be analyzed using a transport block size (TBS) estimated from the DCI transmitted to the active RNTI.

The analyzing of the frequency use status may include analyzing carrier aggregation. The carrier aggregation may be analyzed using cross-carrier scheduling in which a carrier indicator field (CIF) in the DCI is included, and self-scheduling in which a same RNTI is scheduled in cells of different frequency bands.

The analyzing of the frequency use status may include analyzing a control channel usage status using at least one of a control format indicator (CFI), a number of RNTIs, a DCI format ratio, or a number of sets of DCI.

According to another aspect, there is provided an apparatus for analyzing a frequency use status, the apparatus including a processor and a memory including a computer-readable instruction. When the instruction is executed by the processor, the processor may obtain a candidate RNTI using DCI, estimate an active RNTI from the candidate RNTI, and analyze a frequency use status using the active RNTI.

For the obtaining of the candidate RNTI, the processor may decode the DCI using an RA-RNTI used to transmit a TC-RNTI allocated to a terminal by a base station, and obtain the candidate RNTI from data transmitted through a PDSCH specified by the DCI.

For the obtaining of the candidate RNTI, the processor may decode a coded bit string of the DCI, estimate a CRC from the decoded bit string, and perform an XOR operation on the estimated CRC and a CRC of the decoded bit string.

For the estimating of the active RNTI from the candidate RNTI the processor may determine whether a CCE index corresponding to a PDCCH transmitting the DCI including to the candidate RNTI is included in a result of a hash function for the candidate RNTI, and estimate the candidate RNTI as the active RNTI when the CCE index is determined to be included in the result of the hash function.

For the estimating of the active RNTI from the candidate RNTI, the processor may determine a hamming distance between a bit string re-encoded from the decoded bit string and the coded bit string of the DCI, and estimate the candidate RNTI as the active RNTI when the determined hamming distance is less than or equal to a threshold hamming distance $HD_x$.

For the estimating of the active RNTI from the candidate RNTI, the processor may estimate the candidate RNTI as the active RNTI, when a path metric calculated during the decoding increases to a value or greater, or when a difference between path metrics is less than or equal to a threshold value.

For the estimating of the active RNTI from the candidate RNTI, the processor may estimate the candidate RNTI as the active RNTI using depatterning between a modulated constellation point of a bit string re-encoded from the decoded bit string and a modulated constellation point of the coded bit string of the DCI.

The depatterning may indicate a complex conjugate operation between modulated constellation point of the bit string re-encoded from the decoded bit string and the modulated constellation point of the coded bit string of the DCI.

The processor may calculate an error between an average of results from the depatterning and each of the results from the depatterning, and estimating the candidate RNTI as the active RNTI when an SNR determined through the error is greater than or equal to a threshold value.

The processor may manage an active RNTI list including the estimated active RNTI.

For the managing of the active RNTI list, the processor may add the active RNTI to the active RNTI list. The active RNTI to be added to the active RNTI list may be an RNTI obtained in a RACH process in which the terminal attempts to be connected to the cell, an RNTI in which a DCI format of 0 appears $N_{F0}$ times or more, or an RNTI appearing N times or more during a predetermined time $T_0$ configured by subframe unit.

For the managing of the active RNTI list, the processor may delete the active RNTI from the active RNTI list. The active RNTI to be deleted from the active RNTI list may be an RNTI that does not appear in the PDCCH during a time $T_R$ indicated by a number of subframes.

The processor may analyze an RB usage rate. The RB usage rate may be analyzed using an RB allocation field of the DCI transmitted to the active RNTI, or analyzed using an RB occupied in the PDSCH.

The processor may analyze traffic. The traffic may be analyzed using a TBS estimated from the DCI transmitted to the active RNTI.

The processor may analyze carrier aggregation. The carrier aggregation may be analyzed using cross-carrier scheduling in which a CIF in the DCI is included, and self-scheduling in which a same RNTI is scheduled in cells of different frequency bands.

The processor may analyze a control channel usage status using at least one of a CFI, a number of RNTIs, a DCI format ratio, or a number of sets of DCI.

According to example embodiments, a method and apparatus for analyzing a frequency use status may analyze a status of usage of allocated frequencies without being in an RRC connection to a mobile communication network or a network.

According to example embodiments, a method and apparatus for analyzing a frequency use status may obtain an RNTI or DCI of a wireless communication system without information about a base station or a cell, and analyze a downlink or uplink frequency use status using the obtained RNTI or DCI.

Other features and aspects will be apparent from the following detailed description, the drawings, and the claims.

Figure 1:
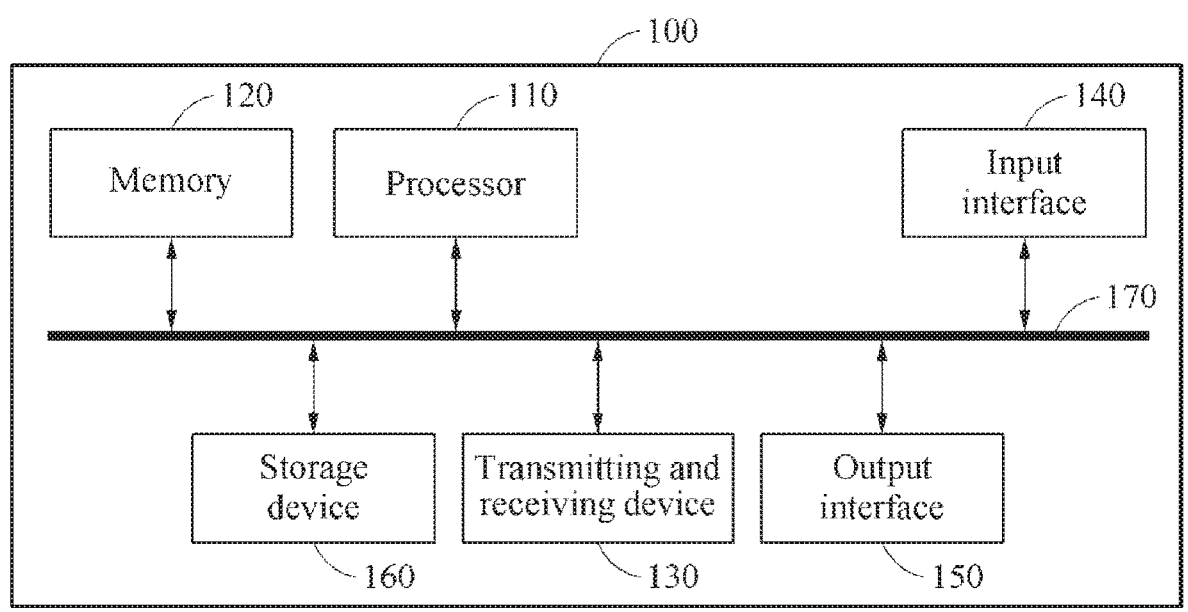
FIG. 1 is a diagram illustrating an example of an apparatus for analyzing a frequency use status according to an example embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings, FIG. 1 is a diagram illustrating an example of an apparatus for analyzing a frequency use status according to an example embodiment. The apparatus for analyzing a frequency use status will be simply referred to as a frequency use status analyzing apparatus hereinafter. In addition, a frequency use status may also be referred to as a spectrum use status. Referring to FIG. 1, a frequency use status analyzing apparatus 100 may be embedded in a base station or a terminal, or a separate apparatus disposed outside the base station or the terminal.

The frequency use status analyzing apparatus 100 includes at least one processor 110, a transmitting and receiving device 130 connected to a network and configured to perform communication, and a memory 120. In addition, the frequency use status analyzing to apparatus 100 further includes an input interface 140, an output interface 150, and a storage device 160. The components included in the frequency use status analyzing apparatus 100 may be connected to one another through a bus 170 to communicate with one another.

The processor 110 may execute a program instruction stored in at least one of the memory 120 or the storage device 160. The processor 110 may be a central processing unit (CPU), a graphics processing unit (GPO, or a dedicated processor configured to perform methods described herein. The processor 110 may control each of the components of the frequency use status analyzing apparatus 100. The transmitting and receiving device 130 may transmit and receive a wired signal or a wireless signal. The frequency use status analyzing apparatus 100 may use a single antenna or multiple antennas.

According to an example embodiment, the frequency use status analyzing apparatus 100 may obtain a radio network temporary identifier (RNTI) of a terminal connected to a cell managed and/or operated by the base station, or downlink control information (DCI), without being in a radio resource control (RRC) connection to a mobile communication network or a network, and analyze a status of usage of frequency resources used by the cell.

A mobile communication system may provide a voice/data service to a terminal using, for example, orthogonal frequency-division multiplexing (OFDM). Herein, all sets of information associated with the voice/data service to be transmitted to the terminal may indicate user traffic. The user traffic may be divided into subframes by 1 millisecond (ms) unit, for example. The user traffic divided into each of the subframes may be transmitted from the base station to the terminal using a physical downlink shared channel (PDSCH). Herein, a single subframe may include a plurality of PDSCHs.

The DCI may be transmitted through a physical downlink control channel (PDCCH) included in a same subframe as one in which the PDSCH is included. The DCI may include resource allocation information or resource control information for the terminal and a group of a plurality of terminals. The DCI may include, for example, uplink scheduling information, downlink scheduling information, uplink transmission power control command, and the like.

The DCI to be transmitted through the PDCCH may be of different formats based on a type of information field and a number of information fields, a number of bits of each of the information fields, and a purpose of control information to be transmitted. For example, DCI formats 0, 3, 3A, 4, and 4A, may be used for an uplink, and DCI formats 1, 1A, 1B, 1C, 1D, 2, 24, 2B, 2C, and 2D, may be used for a downlink. Each of the DCI formats may selectively include, for example, information associated with a carrier indicator field (CIF), resource block (RB) assignment or allocation, a modulation coding scheme (MCS), a redundancy version (RV), a new data indicator (NDI), transmit power control (TPC), a hybrid automatic repeat request (HARQ) process number, precoding matrix indicator (PMI) confirmation, a hopping flag, a flag field, and the like. Thus, a size of control information corresponding to each of the DCI formats may vary based on a DCI format.

The PDCCH may be transmitted through aggregation of a single control channel element (CCE) or a plurality of successive CCEs. A CCE may indicate a logical allocation unit, and include a plurality of radio element groups (REGs). In addition, a number of bits to be transmitted through the PDCCH may be determined based on a relationship between a number of CCEs and a code rate provided by a CCE.

To control information to be transmitted through the PDCCH based on a DCI format, a cyclic redundancy check (CRC) for error detection may be attached. Herein, an RNTI may be masked in the CRC based on a PDCCH reception target (e.g., terminal) or a PDCCH reception purpose. In detail, the CRC scrambled based on the RNTI may be attached to the control information to be transmitted through the PDCCH.

The frequency use status analyzing apparatus 100 may receive a downlink signal without being in the RRC connection, and obtain an active RNTI and DCI and analyze a frequency use status using the obtained active RNTI and DCI.

[Candidate RNTI Acquisition Method]

According to an example embodiment, the frequency use status analyzing apparatus 100 may obtain a candidate RNTI without being in an RRC connection using the following two methods.

Method 1: the frequency use status analyzing apparatus 100 may decode a coded bit string of received DCI. When there is no error in the decoded bit string, the frequency use status analyzing apparatus 100 may estimate a CRC from a bit string of the decoded bit string from which a portion of the CRC is excluded. The frequency use status analyzing apparatus 100 may perform an (XOR) operation on the estimated CRC and the CRC of the decoded bit string to obtain a candidate RNTI.

Method 2: the terminal may perform a random-access (RA) process to access a network, and the base station may allocate a temporary cell-RNTI (TC-RNTI) to the terminal. Herein, DCI corresponding to a resource transmitting the TC-RNTI may use an RA-RNTI. Thus, the frequency use status analyzing apparatus 100 may decode the DCI masked with the CRC using the RA-RNTI, and then obtain the TC-RNTI from data, for example, message 2, through a PDSCH specified by the DCI. Thus, the frequency use status analyzing apparatus 100 may obtain a candidate RNTI.

According to an example embodiment, the frequency use status analyzing apparatus 100 may estimate, as an active RNTI, the candidate RNTI obtained based on at least one of method 1 or method 2 described above, and use the estimated active RNTI. Alternatively, the frequency use status analyzing apparatus 100 may estimate an active RNTI among candidate RNTIs using an active RNTI estimation method to be described hereinafter, and use the estimated active RNTI. Alternatively, the frequency use status analyzing apparatus 100 may immediately estimate, as being valid or active, a portion of candidate RNTIs obtained by a combination of a candidate RNTI acquisition method and the active RNTI estimation method, and also estimate, as being valid or active, another portion of the candidate RNTIs after the active RNTI estimating method, and then use the estimated active RNTI.

In detail, the frequency use status analyzing apparatus 100 may estimate a candidate RNTI obtained using method 2 as an active RNTI. However, the frequency use status analyzing apparatus 100 may verify whether a candidate RNTI obtained using method 1 is an active RNTI or not by applying the active RNTI estimation method to the candidate RNTI. The active RNTI estimation method may also indicate an active DCI estimation method.

A size of DCI may vary based on a DCI format transmitted to a CCE resource and a DCI standard. Thus, a channel coding and decoding process may be performed multiple times or in parallel with respect to the DCI. Herein, the active RNTI estimation method using method 1 may detect transmitted DCI and detect an RNTI corresponding to the DCI, and a candidate RNTI passing the active RNTI estimation method may be classified as an active RNTI. Hereinafter, the active RNTI estimation method will be described in detail.

[Active RNTI Estimation Method]

A method of estimating an active RNTI or active DCI include at least one of the following methods.

Method A: the frequency use status analyzing apparatus 100 may determine whether a CCE index corresponding to a PDCCH transmitting DCI including a candidate RNTI is included in a result of a hash function for the candidate RNTI. When the CCE index is determined to be included in the result of the hash function, the frequency use status analyzing apparatus 100 may classify the candidate RNTI as an active RNTI.

Method B: the frequency use status analyzing apparatus 100 may determine a hamming distance between a bit string re-encoded from a decoded bit string and a coded bit string of DCI. When the hamming distance is less than equal to a threshold hamming distance $HD_x$, the frequency use status analyzing apparatus 100 may classify a candidate RNTI as an active RNTI.

Method C: when a path metric calculated in a channel coding and decoding process increases to a predetermined value or greater, or a difference between path metrics is less than or equal to a threshold value, the frequency use status analyzing apparatus 100 may estimate a candidate RNTI as an active RNTI.

Method D: the frequency use status analyzing apparatus 100 may estimate a candidate RNTI as an active RNTI using a correlation dispersion or depatterning between a modulated constellation point of a bit string re-encoded from a decoded bit string and a modulated constellation points of a coded bit string of DCI. The depatterning may indicate a complex conjugate operation between a modulated constellation point of the decoded bit string and a modulated constellation point of the re-encoded bit string.

In detail, the frequency use status analyzing apparatus 100 may estimate a candidate RNTI as an active RNTI using an average of values resulting from the depatterning or a value calculated for an average depatterning signal with a value of 1, and an error calculated by a difference between the average or the value of 1 and each of depatterning values. The signal and error values may be calculated using a combination of at least one of a value derived from a real value of a complex number, a power value, a norm value, an absolute value, a squared value of each of a real part and a complex part, a root value of the squared value, or a variance value. Herein, when a ratio between the average signal and the error value is defined as a signal-to-noise ratio (SNR) and the SNR is greater than or equal to a threshold value, the frequency use status analyzing apparatus 100 may adopt an active RNTI and DCI.

Figure 5:
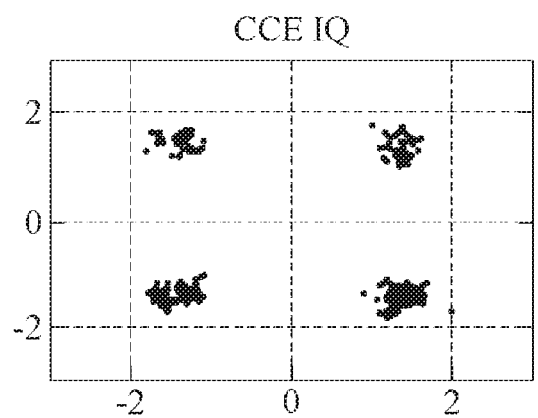
FIG. 5 is a diagram illustrating results of simulating a method D according to an example embodiment.
Figure 5:
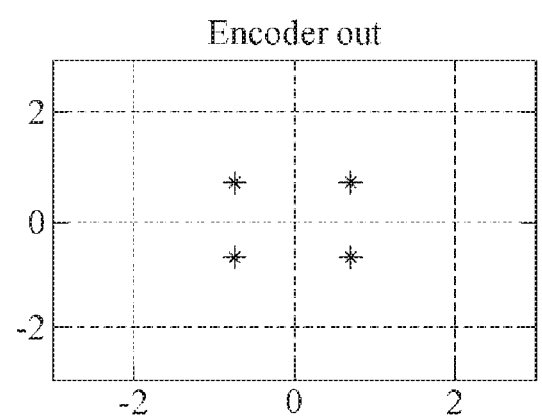
Figure 5:
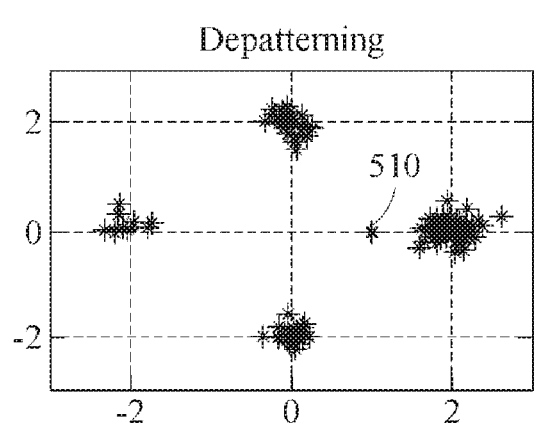
Figure 5:
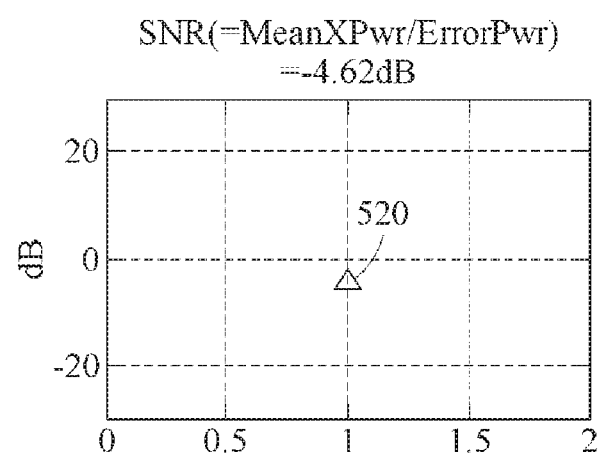

FIG. 5 is a diagram illustrating results of simulating the method D according to an example embodiment. FIG. 5 illustrate a result of modulating two bit strings and performing depatterning, in which a reference numeral 510 indicates a position corresponding to a mean or average of a depatterning signal, and a reference numeral 520 indicates an SNR result of −4.62 decibels (dB). It is verified that a low SNR is derived because there is no correlation between the two strings. Herein, when a threshold value is assumed to be 0 dB, a frequency use status analyzing apparatus may estimate an RNTI or DCI as not being active or valid because the depatterning SNR is less than 0 as illustrated in FIG. 5.

Figure 6:
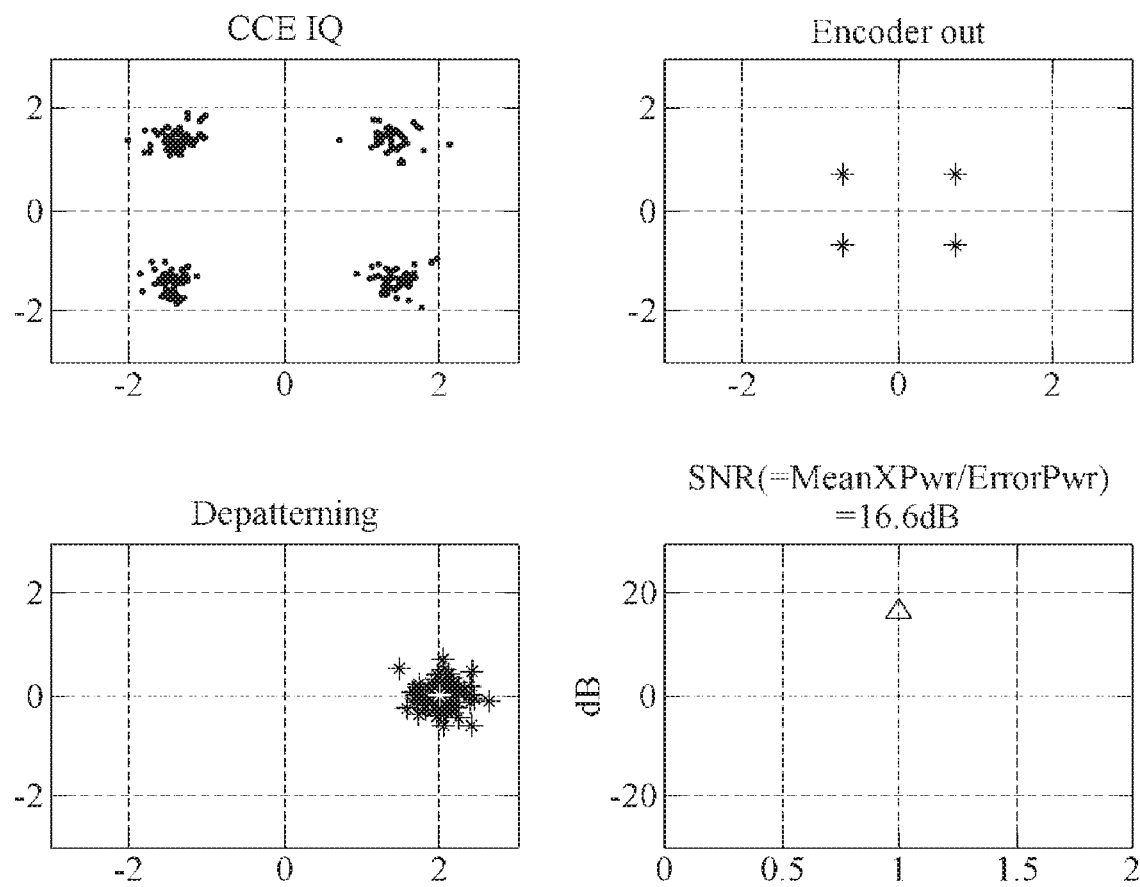
FIG. 6 is a diagram illustrating results of depatterning modulated constellation points of two valid bit strings according to an example embodiment.

FIG. 6 is a diagram illustrating results of depatterning modulated constellation points of two valid bit strings according to an example embodiment. FIG. 6 illustrates results with an SNR of 16.6 dB, in comparison to the results illustrated in FIG. 5.

According to an example embodiment, a frequency use status analyzing apparatus may manage a list of RNTIs determined to be active RNTIs, and minimize an error in RNTI detection and DCI decoding using the RNTIs on the list. The list is also referred to herein as an active RNTI list.

The managing of the active RNTI list may include i) a method of generating the list or adding an RNTI to the list (hereinafter list management 1), ii) a method of maintaining the RNTIs on the list and using the RNTIs (hereinafter list management 2), or iii) a method of removing an RNTI from the list (hereinafter list management 3). List management 1, list management 2, and list management 3 to be described hereinafter may be individually performed, or at least one of those may be performed in combination.

List management 1 may include at least one of the following.

i) the frequency use status analyzing apparatus may obtain TC-RNTI information in a random-access channel (RACH) process in which a terminal attempts to be connected to a cell, and add a corresponding RNTI to the active RNTI list.

ii) the frequency use status analyzing apparatus may add, to the active RNTI list, an RNTI in which DCI format 0 appears $NF_0$ times or more. A base station or a cell may periodically allocate a resource for each terminal to transmit information to be fed back to the base station or the cell. The resource allocation may be configured by DCI format 0. That is, the base station or the cell may transmit DCI format 0 to a terminal having an active RNTI during a predetermined unit interval. Thus, the frequency use status analyzing apparatus may manage the active RNTI list using the RNTI of DCI format 0 that may appear repeatedly.

iii) when a same RNTI appears N times or more during a predetermined time $T_0$, the frequency use status analyzing apparatus may add the RNTI to the active RNTI list. Herein, $T_0$ may be configured by subframe unit.

iv) the frequency use status analyzing apparatus may manage the active RNTI list based on a weight calculation. In detail, the frequency use status analyzing apparatus may add a weight $W_0$ each time a same RNTI appears in DCI format 0, add a weight $W_s$ each time a same RNTI appears in a different DCI format. Herein, a sum of all weights may be maintained not to exceed Wmax. In addition, the frequency use status analyzing apparatus may subtract a weight $W_N$ for each subframe in which an RNTI does not appear based on list management 3 to be described hereinafter.

List management 2 may include at least one of the following.

i) the frequency use status analyzing apparatus may verify whether DCI is received for each CCE including an RNTI registered on the active RNTI list for each subframe.

ii) the frequency use status analyzing apparatus may verify whether DCI is received based on a priority or weight of an RNTI registered on the active RNTI list for each subframe.

iii) the frequency use status analyzing apparatus may assign a priority to an RNTI masked in a CRC of DCI transmitted to a PDCCH from each subframe.

iv) the frequency use status analyzing apparatus may assign a weight based on a number of subframes in which an RNTI masked in a CRC of DCI transmitted to a PDCCH from each subframe appears.

v) the frequency use status analyzing apparatus may verify, as an active RNTI, an RNTI masked in a CRC of DCI transmitted to a PDCCH from each subframe.

vi) the frequency use status analyzing apparatus may store a number of subframes in which an RNTI masked in a CRC of DCI transmitted to a PDCCH from each subframe appears.

vii) the frequency use status analyzing apparatus may store a number of subframes of each RNTI which does not appear as an RNTI masked in a CRC of DCI transmitted to a PDCCH from each subframe.

viii) when a plurality of candidate RNTIs is detected in a PDCCH, the frequency use status analyzing apparatus may determine an RNTI based on whether the RNTI is on the active RNTI list, or weight information or priority information.

ix) the frequency use status analyzing apparatus may indicate or manage an RNTI operating through carrier aggregation (CA).

x) the frequency use status analyzing apparatus may indicate or manage an RNTI supporting a 256 quadrature amplitude modulation (QAM) order.

List management 3 may include the following. The frequency use status analyzing apparatus may delete, from the active RNTI list, an RNTI which is not scheduled during a time $T_R$. Herein, the RNTI not being scheduled may indicate one that does not appear in a PDCCH, and $T_R$ may be indicated by a number of subframes.

Figure 2:
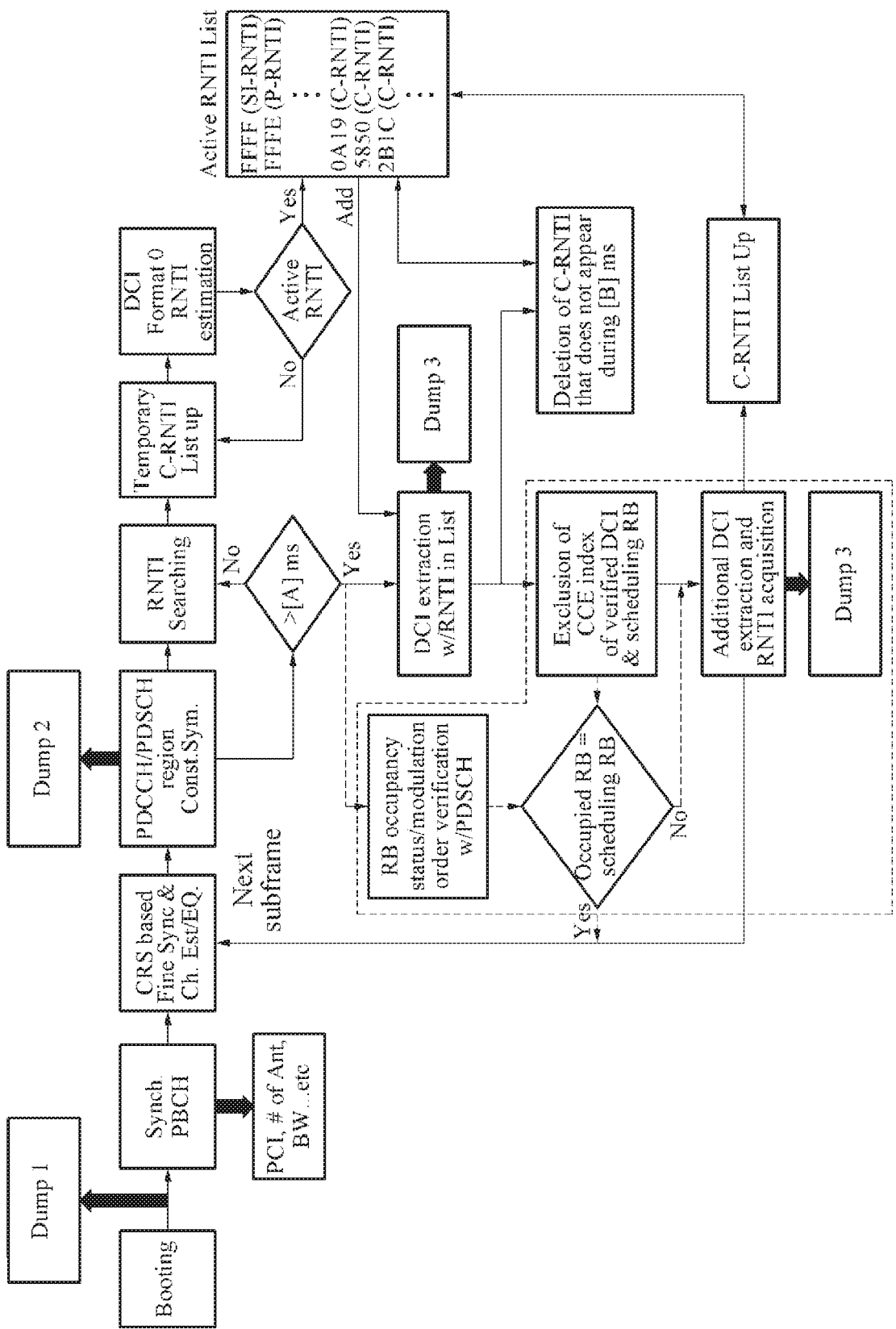
FIG. 2 is a diagram illustrating an example of how an active radio network temporary identifier (RNTI) and downlink control information (DCI) are obtained according to an example embodiment.

FIG. 2 is a diagram illustrating an example of how an active RNTI and DCI are obtained according to an example embodiment. According to an example embodiment, a frequency use status analyzing apparatus may combine one or more methods described above to obtain an active RNTI and DCI.

Referring to FIG. 2, the frequency use status analyzing apparatus may perform, on a received signal, time and frequency synchronization, and channel estimation and compensation block. Herein, a process of dump 1 in which in-phase and quadrature phase sample data of a time domain is collected may be performed. In addition, a process of dump 2 in which modulated constellation point data of a control channel symbol area after the channel estimation and the compensation block is collected may also be performed. During the time and frequency synchronization, the frequency use status analyzing apparatus may collect information associated with a physical cell identifier (ID), an antenna configuration of a base station, a physical hybrid automatic repeat request indicator channel (PHICH) group, a frame number, a bandwidth, and the like. Such processes and the collected information may be applicable to another example embodiment to be described hereinafter.

The frequency use status analyzing apparatus may obtain a candidate RNTI through a PDCCH to which a CCE is transmitted, after the channel estimation and compensation block. The obtained candidate RNTI may be temporarily stored by a unit of at least one subframe, or managed using a list. An RNTI determined to be an active RNTI among candidate RNTIs may be included in an active RNTI list and managed therein. Herein, to estimate an active RNTI, one or more methods described above may be used.

An amount of time, for example, A milliseconds (ms), may be used to initially configure the active RNTI list. After the A ms elapses, the frequency use status analyzing apparatus may decode DCI from RNTIs included in the active RNTI list.

For example, when DCI to be transmitted to some CCEs is not decoded, the frequency use status analyzing apparatus may obtain a new active RNTI and manage the obtained new active RNTI on the active RNTI list using the candidate RNTI acquisition method and the active RNTI estimation method described above.

In addition, the frequency use status analyzing apparatus may remove, from the active RNTI list, an RNTI which is not used for DCI transmission during B ms although it is included in the active RNTI. The frequency use status analyzing apparatus may verify whether there is an error in detected active DCI based on whether an RB occupied by a PDSCH and an RB scheduled by the DCI correspond to each other.

For example, when a resource not scheduled by the DCI is occupied, the frequency use status analyzing apparatus may determine that cross-carrier scheduling is applied. Alternatively, when a corresponding RB is not used although the DCI is determined to be valid or active, the frequency use status analyzing apparatus may verify that there is an error in the determination of the active DCI.

Figure 3:
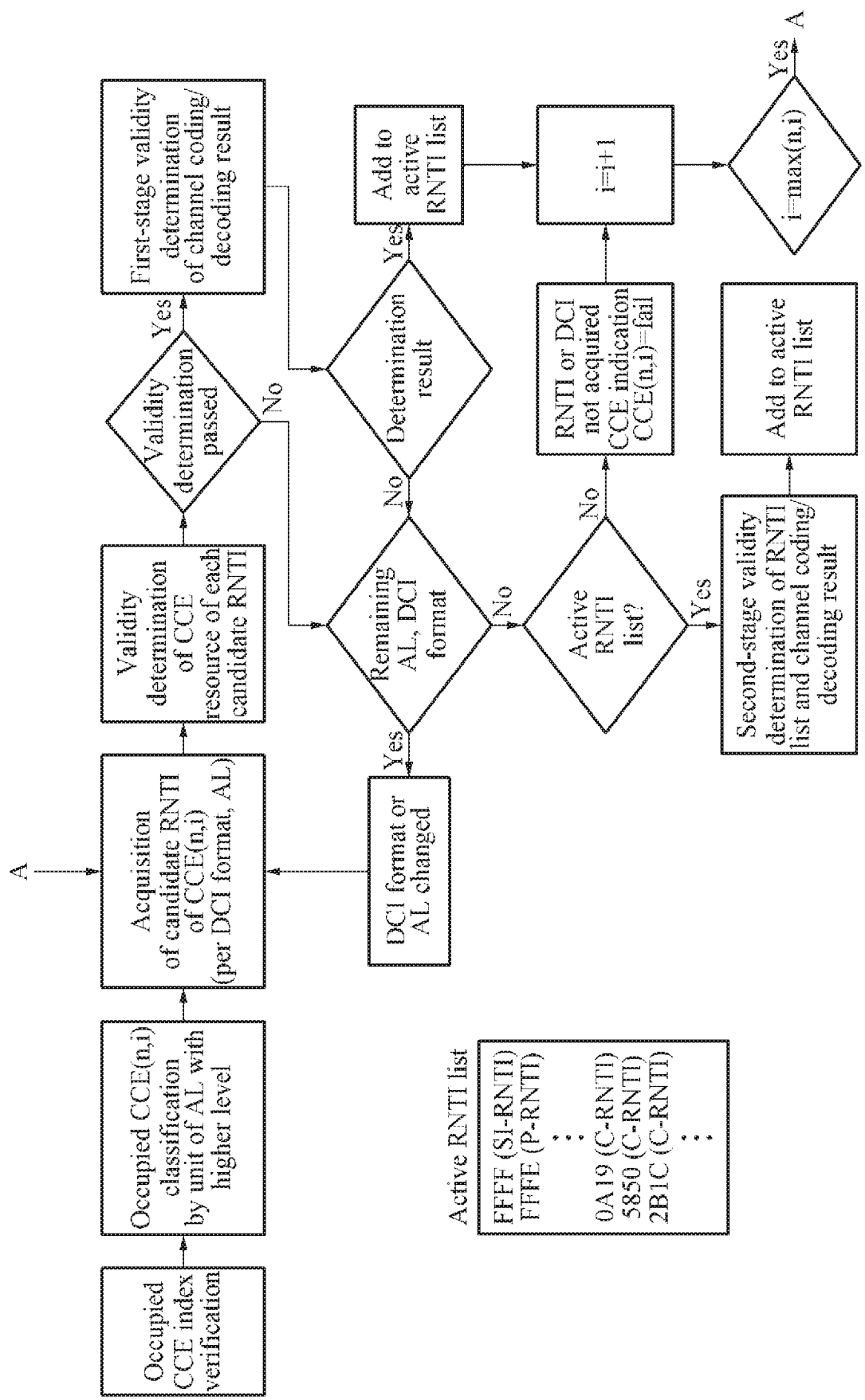
FIG. 3 is a diagram illustrating another example of how an active RNTI and DCI are obtained according to an example embodiment.

FIG. 3 is a diagram illustrating another example of how an active RNTI and DCI are w obtained according to an example embodiment.

A frequency use status analyzing apparatus may identify a CCE index used for PDCCH transmission. Herein, a PDCCH may be transmitted to a CCE of aggregation level (AL) 1, 4, and 8, and thus the frequency use status analyzing apparatus may identify successively occupied CCE units.

According to an example embodiment, the frequency use status analyzing apparatus may classify successive CCEs of AL 8, 4, 2, and 1 into one analysis unit, and define it as an i-th CCE analysis unit of an n-th subframe. A single CCE analysis unit may be configured by AL 8, 4, 2, and 1 of different sizes. Such a single analysis unit may be used for active RNTI and/or DCI determination, starting from a higher AL.

Herein, when no active RNTI and/or DCI is detected at a high AL, the frequency use status analyzing apparatus may change the AL to AL/2. For example, when no active RNTI and/or DCI is detected at AL 8, the frequency use status analyzing apparatus may change AL 8 to AL 4. In this example, an AL is reduced by half, and thus the frequency use status analyzing apparatus may perform the active RNTI and/or DCI determination on double candidate CCE analysis units, compared to the high AL.

Herein, such validity determination may be performed to determine whether a detected RNTI uses a valid CCE resource using a hash function. For example, when validity is not determined through the validity determination, the frequency use status analyzing apparatus may perform again the validity determination under a changed condition, for example, a next DCI format or AL. A first-stage validity determination of a result of channel coding and decoding may be performed using combined information of at least one of a path metric derived from the channel coding and decoding, or a hamming distance (HD) by re-encoding a decoded bit.

A threshold HD value of the first-stage validity determination may be determined to be 0 or a specific value. Herein, the specific value may be determined based on an SNR of a CCE analysis unit or a channel state of a signal strength. That is, the threshold HD value may be determined based on a channel state of a subcarrier of a CCE analysis unit and a DCI bit size.

Based on the threshold HD value of the first-stage validity determination, an RNTI that passes the validity determination may be added to the active RNTI list and managed therein. On the contrary, when an RNTI fails to pass the validity determination, the frequency use status analyzing apparatus may perform again the validity determination under a changed condition, for example, a next DCI format or AL.

For example, when no active RNTI and/or DCI is detected in a CCE analysis unit at a high AL, the following process may be performed based on a state of the active RNTI list. When the active RNTI list is not available, the frequency use status analyzing apparatus may determine the detection of DCI of the CCE analysis unit to be a failure. When such an unavailable state of the active RNTI list is changed to an available state, the frequency use status analyzing apparatus may perform second-stage validity determination to detect an active RNTI and/or DCI.

When the list of active RNTIs is available, the frequency use status analyzing apparatus may perform the second-stage validity determination. The second-stage validity determination may be performed using a method of using a result of the channel coding and decoding of the active RNTI estimation method, and/or a method of using the active RNTI list.

According to an example embodiment, the frequency use status analyzing apparatus may use RNTIs derived from validity determination and a threshold HD value of the result of the channel coding and decoding. Herein, an RNTI, among the derived RNTIs, which is not on the active RNTI list, may be excluded or not be used. An RNTI and DCI having a DCI format and AL with a small threshold HD value may be determined to be active RNTI and DCI. Herein, the threshold HD value may be less than a second-stage threshold value. For example, a CCE analysis unit not satisfying all such conditions may be determined to be a. PDCCH decoding error.

Figure 4:
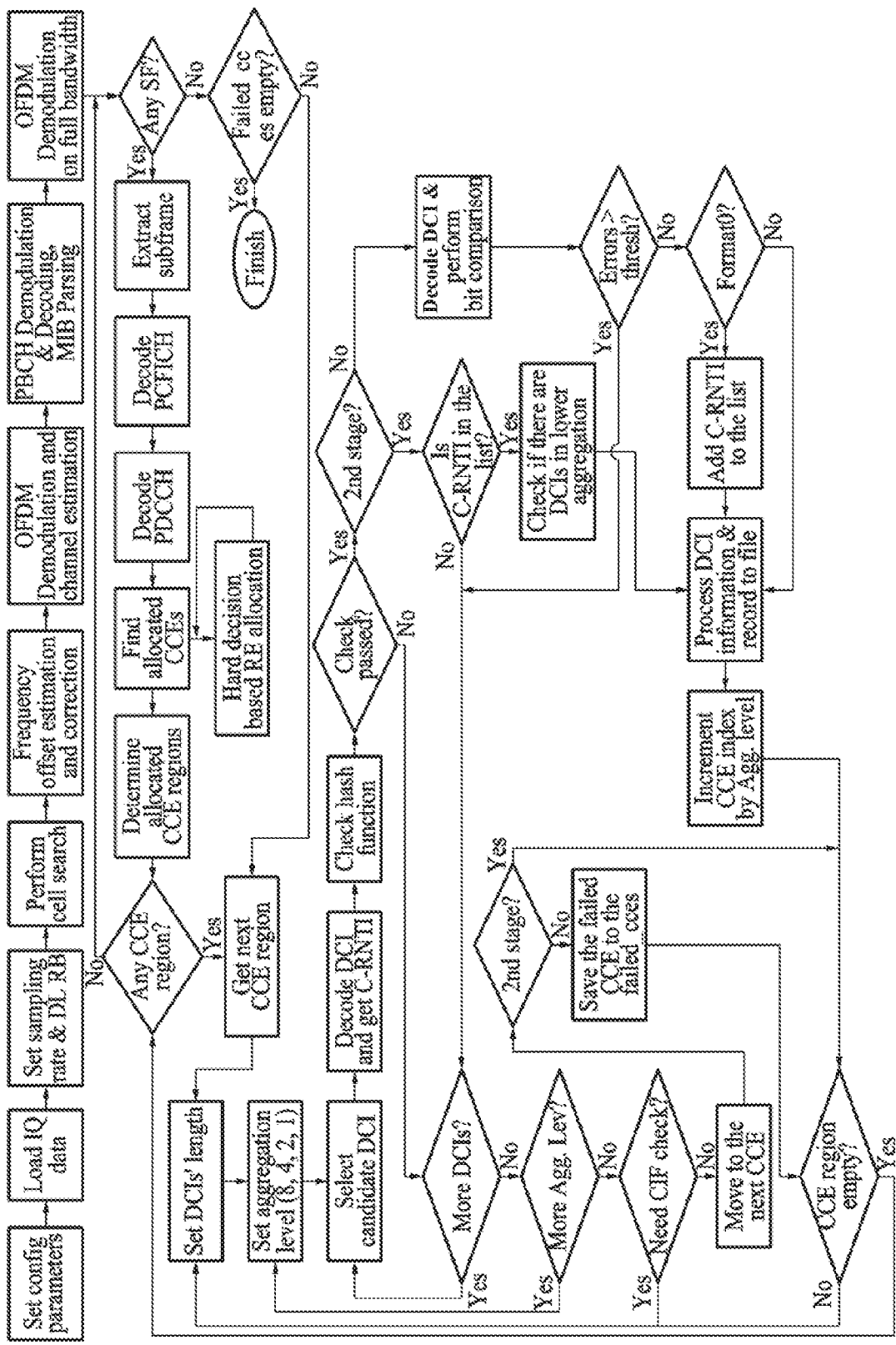
FIG. 4 is a diagram illustrating an example of a method of obtaining DCI in a first stage and a second stage according to an example embodiment.

FIG. 4 is a diagram illustrating an example of a method of obtaining DCI in a first stage and a second stage according to an example embodiment. Hereinafter, the method of obtaining DCI will be simply referred to as a DCI acquisition method.

In a first step, a frequency use status analyzing apparatus may detect a candidate RNTI at each AL for each DIC format and verify first validity using a hash function. When there is a difference in bit by a value less than or equal to a set threshold value between a re-encoded bit string and a received bit string with respect to an RNTI and DCI passing such validity determination after comparing the re-encoded bit string and the received bit string, the frequency use status analyzing apparatus may determine the RNTI and the DCI to be valid or active. In response to a determination that the RNTI and the DCI are valid or active, the frequency use status analyzing apparatus may add the RNTI to an active RNTI list and manage the active RNTI list to which the RNTI is added. However, when an active RNTI and DCI are not detected from a CCE, the frequency use status analyzing apparatus may perform a second stage to be described hereinafter.

In the second stage, when a detected cell-RNTI (C-RNTI) is present on the active RNTI list, the frequency use status analyzing apparatus may determine the RNTI to be valid or active without verifying a bit string. However, the frequency use status analyzing apparatus may also detect an RNTI at an AL less than a current AL at which the RNTI is detected.

According to an example embodiment, the frequency use status analyzing apparatus may analyze a frequency use status using an active RNTI obtained through the process described in the foregoing. The frequency use status may include information associated with an RB usage rate, traffic, CA, and a control channel usage status.

[RB Usage Rate]

An RB usage rate may be analyzed using an RB allocation field of DCI transmitted by being masked in an active RNTI or an RB in which a signal is occupied in a PDSCH area.

For example, when there is no DCI decoding error, it is possible to use the RB allocation field of the DCI. The frequency use status analyzing apparatus may collect statistical information of an RB usage rate for each RNTI in addition to statistical information of an RB usage rate for each cell. The frequency use status analyzing apparatus may analyze a total number of RNTIs at each unit time of observation or a modulation coding scheme (MCS) allocated to each RNTI of statistical characteristics, and/or a correlation between an amount of traffic and an RB usage rate, or an RB allocation rate.

For another example, an analysis of an RB occupied in a PDSCH area may be used to collect statistical information of an RB usage rate for each cell. The frequency use status analyzing apparatus may collect the information by indicating signal occupancy by RB unit for each subframe. In this example, a size of the collected information may be determined based on a bandwidth of a service signal. For example, a signal with a 10 megahertz (MHz) may have a size of 50 bits per subframe. The signal occupancy may be verified through, for example, energy detection.

As an example of the energy detection, the frequency use status analyzing apparatus may compare an average energy of each resource element (RE) including 12 subcarriers and a maximum of 13 orthogonal frequency-division multiplexing (OFDM) symbols to a threshold value $P_{occupied}$ for each RB. As another example of the energy detection, the frequency use status analyzing apparatus may compare a common reference signal (CRS) included in each RB, and compare an energy to a threshold value $P_{compare}$ with a constant average energy.

In addition, as an example of determining the signal occupancy, the frequency use status analyzing apparatus may verify whether a modulated constellation point symbol based on channel compensation or multiple-input and multiple-output (MIMO) decoding is in a form or distribution of quadrature phase-shift keying (QPSK), or 16 QAM, 64 QAM, or 256 QAM.

[Traffic Analysis]

The frequency use status analyzing apparatus may analyze traffic using a transport block size (TBS) estimated from DCI transmitted by being masked in a collected active RNTI. The traffic analysis may be divided into analyzing traffic information transmitted in terms of wireless channel and analyzing traffic information determined to be transmitted without an error.

For example, the traffic information transmitted in terms of wireless channel may be obtained by statistically analyzing the TBS estimated from the DCI. The frequency use status analyzing apparatus may analyze statistical information of traffic per RNTI in addition to statistical information of traffic per cell. The analysis of the statistical information per RNTI may be divided into applying only a subframe to be scheduled by the DCI and applying an entire observation time. For another example, the traffic information determined to be transmitted without an error may be determined based on an HARQ process number (HARQ_PN), an NDI, and an RV, in addition to the TBS.

For example, when data is erroneously received, a transmitting end may re-transmit the same data. Thus, re-transmitted traffic may not need to be included in actual traffic. The frequency use status analyzing apparatus may verify whether it is a new data transmission for each HARQ_PN through a block. Herein, the block may be determined to be new data when an NDI for a same HARQ_PN is 0 to 1, or 1 to 0, which is different from previously scheduled information. The block may be managed for each active RNTI included in an active RNTI list.

[CA Analysis]

CA information may be analyzed through cross-carrier scheduling in which a CIF is included in DCI and self-scheduling by which a same RNTI is scheduled in cells in different w bands.

A total bit size of the DCI may be increased by 3 bits by the CIF. The frequency use status analyzing apparatus may perform decoding on an available length of the DCI when collecting an active RNTI.

For example, when the CIF is included, a length of a candidate set of DCI may increase. The frequency use status analyzing apparatus may analyze DCI with all available lengths. Alternatively, when the CIF is present, the frequency use status analyzing apparatus may increase a number of candidate sets of DCI.

For example, when, by comparing RBs to be scheduled, there are different occupied RBs or RB resources to be scheduled by two or more sets of DCI overlap, the frequency use status analyzing apparatus may determine that there is a possibility of the cross-carrier scheduling.

According to an example embodiment, table 1 indicates bit sizes of some available DCI formats based on the presence of a CIF under the 3rd generation partnership project (3GPP) Release 8 or higher Releases in a 10 MHz bandwidth and a 20 MHz bandwidth.

TABLE 1

| | 10 MHz bandwidth | | | 20 MHz bandwidth | | |
| | | Beyond Rel8 | | | Beyond Rel8 | |
| | Rel-8 | No CIF | CIF | Rel-8 | No CIF | CIF |
|---|---|---|---|---|---|---|
| DCI 0/1A | 27 | 27 | 30 | 28 | 29 | 33 |
| DCI 1 | 31 | 31 | 34 | 39 | 39 | 42 |
| DCI 1B Ant 2 | 28 | 28 | 31 | 30 | 30 | 34 |
| Ant 4 | 30 | 30 | 33 | 33 | 33 | 35 |
| DCI 1C | 14 | 14 | | 15 | 15 | |
| DCI 1D Ant 2 | 28 | 28 | 31 | 30 | 30 | 34 |
| Ant 4 | 30 | 30 | 33 | 33 | 33 | 35 |
| DCI 2 Ant 2 | 43 | 43 | 46 | 51 | 51 | 54 |
| Ant 4 | 46 | 46 | 49 | 54 | 54 | 57 |
| DCI 2A Ant 2 | 41 | 41 | 43 | 48 | 48 | 51 |
| Ant 4 | 42 | 42 | 45 | 50 | 50 | 53 |
| DCI 2B (DMRS 2P) | 41 | 41 | 43 | 48 | 48 | 51 |
| DCI 2C (DMRS 4Ps) | 42 | 42 | 45 | 50 | 50 | 53 |
| DCI 2D (CoMP) | 45 | 45 | 47 | 52 | 52 | 55 |

Referring to table 1 above, when analyzing an available DCI length including a CIF, the DCI may be of a same bit size with different conditions. To accurately estimate transmitted DCI, validity of the DCI may be estimated. According to an example embodiment, validity of DCI may be estimated based on whether an allocated RB resource collides a resource allocated by different DCI. For example, when the frequency use status analyzing apparatus simultaneously receives CA information from a plurality of cells, the frequency use status analyzing apparatus may determine that cells including a same RNTI are carrier aggregated ones.

[Control Channel Usage Status]

According to an example embodiment, a control channel area of a long-term evolution (LTE) standard may include a physical control format indicator channel (PCFICH), a PHICH, and a PDCCH.

The PCFICH indicates a number of symbols of a control channel area of a corresponding downlink subframe. The PHICH is a channel that transmits acknowledge or information in response to a physical uplink shared channel (PUSCH), and a size of a PHICH resource may be determined based on information of a PHICH group of a physical broadcast channel (PBCH).

A number of CCEs which are resources for the PDCCH may be determined based on the number of symbols of the control channel area and the PHICH group. The number of symbols of the control channel area may be determined based on a number of sets of DCI to be transmitted, and the number of sets of DCI may be determined based on a number of terminals and a data usage status of each of the terminals. Thus, the frequency use status analyzing apparatus may analyze a control channel usage status by using a combination of at least one parameter of a control format indicator (CFI), a number of RNTIs, a DCI format ratio, and the number of sets of DCI.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may, be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of analyzing a frequency use status, comprising:
obtaining a candidate radio network temporary identifier (RNTI) decoding a coded bit string of downlink control information (DCI);
estimating an active RNTI from the candidate RNTI;
managing an active RNTI list including the estimated active RNTI, and
analyzing a frequency use status using the estimated active RNTI,
wherein the DCI includes collected information associated with an antenna configuration of a base station,
wherein the estimating of the active RNTI from the candidate RNTI comprises: estimating the candidate RNTI as the active RNTI using depatterning between a modulated constellation point of a bit string re-encoded from the decoded bit string and a modulated constellation point of the coded bit string of the DCI, and
wherein the managing of the active RNTI list includes: verifying whether DCI is received for each control channel element (CCE) including an RNTI registered on the active RNTI list for each subframe.

2. The method of claim 1, wherein the obtaining of the candidate RNTI comprises:
decoding the DCI using a random-access-RNTI (RA-RNTI) used to transmit a temporary cell-RNTI (TC-RNTI) allocated to a terminal by a base station; and
obtaining the candidate RNTI from data transmitted through a physical downlink shared channel (PDSCH) specified by the DCI.

3. The method of claim 2, wherein the estimating of the active RNTI from the candidate RNTI comprises: determining the obtained candidate RNTI to be the active RNTI.

4. The method of claim 1, wherein the obtaining of the candidate RNTI comprises:
decoding a coded bit string of the DCI;
estimating a cyclic redundancy check (CRC) from the decoded bit string; and
performing an exclusive or (XOR) operation on the estimated CRC and a CRC of the decoded bit string.

5. The method of claim 4, wherein the estimating of the active RNTI from the candidate RNTI comprises:
determining whether a CCE index corresponding to a physical downlink control channel (PDCCH) transmitting the DCI including the candidate RNTI is included in a result of a hash function for the candidate RNTI; and estimating the candidate RNTI as the active RNTI, when the CCE index is determined to be included in the result of the hash function.

6. The method of claim 4, wherein the estimating of the active RNTI from the candidate RNTI comprises:
determining a hamming distance between a bit string re-encoded from the decoded bit string and the coded bit string of the DCI; and
estimating the candidate RNTI as the active RNTI, when the determined hamming distance is less than or equal to a threshold hamming distance $HD_x$.

7. The method of claim 4, wherein the estimating of the active RNTI from the candidate RNTI comprises:
estimating the candidate RNTI as the active RNTI, when a path metric calculated during the decoding increases to a value or greater, or when a difference between path metrics is less than or equal to a threshold value.

8. The method of claim 1, wherein the depatterning indicates a complex conjugate operation between the modulated constellation point of the hit string re-encoded from the decoded bit string and the modulated constellation point of the coded bit string of the DCI.

9. The method of claim 1, further comprising:
calculating an error between an average of results from the depatterning and each of the results from the depatterning; and
estimating the candidate RNTI as the active RNTI, when a signal-to-noise ratio (SNR) determined through the error is greater than or equal to a threshold value.

10. The method of claim 1,
wherein the managing of the active RNTI list includes at least one of the following: i) verifying whether DCI is received based on a priority or weight of an RNTI registered on the active RNTI list for each subframe, ii) assigning a priority to an RNTI masked in a CRC of DCI transmitted to a PDCCH from each subframe, iii) assigning a weight based on a number of subframes in which an RNTI masked in a CRC of DCI transmitted to a PDCCH from each subframe appears, iv) verifying, as an active RNTI, an RNTI masked in a CRC of DCI transmitted to a PDCCH from each subframe.

11. The method of claim 1,
wherein the managing of the active RNTI list comprises: adding the active RNTI to the active RNTI list,
wherein the active RNTI to be added to the active RNTI list is an RNTI obtained in a random-access channel (RACH) process in which a terminal attempts to be connected to a cell.

12. The method of claim 1, wherein the managing of the active RNTI list comprises: deleting the active RNTI from the active RNTI list, wherein the active RNTI to be deleted from the active RNTI list is an RNTI that does not appear in a PDCCH during a time $T_R$ indicated by a number of subframes.

13. The method of claim 1,
wherein the analyzing of the frequency use status comprises: analyzing a resource block (RB) usage rate;
wherein the RB usage rate is analyzed using an RB allocation field of the DCI transmitted to the active RNTI, or analyzed using an RB occupied in a PDSCH.

14. The method of claim 1,
wherein the analyzing of the frequency use status comprises: analyzing traffic,
wherein the traffic is analyzed using a transport block size (TBS) estimated from the DCI transmitted to the active RNTI.

15. The method of claim 1,
wherein the analyzing of the frequency use status comprises: analyzing carrier aggregation,
wherein the carrier aggregation is analyzed using cross-carrier scheduling in which a carrier indicator field (CIF) in the DCI is included, and self-scheduling in which a same RNTI is scheduled in cells of different frequency bands.

16. An apparatus for analyzing a frequency use status, comprising:
a processor; and
a memory including a computer-readable instruction, wherein, when the instruction is executed by the processor, the processor is configured to:
obtain a candidate radio network temporary identifier (RNTI) decoding a coded bit string of downlink control information (DCI);
estimate an active RNTI from the candidate RNTI;
manage an active RNTI list including the estimated active RNTI, and
analyze a frequency use status using the estimated active RNTI,
wherein the DCI includes collected information associated with an antenna configuration of a base station,
wherein the estimating of the active RNTI from the candidate RNTI comprises: estimating the candidate RNTI as the active RNTI using depatterning between a modulated constellation point of a bit string re-encoded from the decoded bit string and a modulated constellation point of the coded bit string of the DCI, and
wherein the managing of the active RNTI list includes: verifying whether DCI is received for each control channel element (CCE) including an RNTI registered on the active RNTI list for each subframe.

17. The apparatus of claim 16, wherein, for the obtaining of the candidate RNTI, the processor is configured to:
decode the DCI using a random-access-RNTI (RA-RNTI) used to transmit a temporary cell-RNTI (TC-RNTI) allocated to a terminal by a base station; and
obtain the candidate RNTI from data transmitted through a physical downlink shared channel (PDSCH) specified by the DCI.

18. The apparatus of claim 16, wherein, for the obtaining of the candidate RNTI, the processor is configured to:
decode a coded bit string of the DCI;
estimate a cyclic redundancy check (CRC) from the decoded bit string; and
perform an exclusive or (XOR) operation on the estimated CRC and a CRC of the decoded bit string.

19. The apparatus of claim 18, wherein, for the estimating of the active RNTI from the candidate RNTI, the processor is configured to:
determine whether a CCE index corresponding to a physical downlink control channel (PDCCH) transmitting the DCI including the candidate RNTI is included in a result of a hash function for the candidate RNTI; and
estimate the candidate RNTI as the active RNTI, when the CCE index is determined to be included in the result of the hash function.

* * * * *